US007222952B2

(12) United States Patent
Uejima

(10) Patent No.: US 7,222,952 B2
(45) Date of Patent: May 29, 2007

(54) METHOD OF PREPARING HARD COPIES

(75) Inventor: Atsushi Uejima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 224 days.

(21) Appl. No.: 10/808,328

(22) Filed: Mar. 25, 2004

(65) Prior Publication Data

US 2004/0189774 A1 Sep. 30, 2004

(30) Foreign Application Priority Data

Mar. 25, 2003 (JP) ............................ 2003-083208

(51) Int. Cl.
*G01D 11/00* (2006.01)

(52) U.S. Cl. ................... 347/100; 106/36.6; 106/36.86

(58) Field of Classification Search ................ 347/100; 106/36.6, 36.86
See application file for complete search history.

(56) References Cited

U.S. PATENT DOCUMENTS

| | | | | |
|---|---|---|---|---|
| 4,952,444 | A * | 8/1990 | Kawamata et al. | 428/141 |
| 5,750,186 | A * | 5/1998 | Frazzitta | 427/8 |
| 6,111,044 | A * | 8/2000 | Yamamoto et al. | 526/266 |
| 6,626,531 | B2 * | 9/2003 | Fujii et al. | 347/105 |
| 6,783,227 | B2 * | 8/2004 | Suzuki et al. | 347/102 |

FOREIGN PATENT DOCUMENTS

| | | | |
|---|---|---|---|
| JP | 02307731 A | * | 12/1990 |
| JP | 11-277724 | | 10/1999 |
| JP | 2000-141708 | | 5/2000 |
| JP | 2000141708 A | * | 5/2000 |
| JP | 2001-53943 | | 2/2001 |

OTHER PUBLICATIONS

English translation of the reference JP 2-307731.

* cited by examiner

*Primary Examiner*—Manish S. Shah
*Assistant Examiner*—Laura E. Martin
(74) *Attorney, Agent, or Firm*—Whitham, Curtis, Christofferson & Cook, PC

(57) ABSTRACT

The invention provides a method of preparing a hard copy by forming a transparent coating layer on a recording medium in areas where image has been recorded. The invention has the first step of causing clear droplets to fly from a recording head toward the areas where image has been recorded and the second step of curing the droplets while they are in flight and the third step of depositing the cured droplets in the image-recorded areas of the recording medium so as to form the coating layer. According to the invention, a clear coating layer over color layer can reproduce an even more accurate gloss than in the prior art and presents the desired surface properties in the absence of steps even if there is unevenness in image recording density, whereby the image has a sufficiently improved texture to look more real.

8 Claims, 2 Drawing Sheets

METHOD OF PREPARING HARD COPIES

BACKGROUND OF THE INVENTION

This invention relates to a method of preparing hard copies by forming a transparent coating layer on a recording medium in areas where image has been recorded by printer or the like.

Using today's image processing technology, one can obtain high-quality image by reading an object with a scanner or camera. However, when the recorded object is output by printer or the like to produce a hard copy, the texture of the object is not easy to represent appropriately by utilizing its gloss, fine asperities on its surface and the like.

One way to express the texture of an object is processing by computer graphics (CG). For example, in three-dimensional data on computer screen that represents the object, specular reflectance, diffusive reflectance and other parameters are defined as texture-representing information and a rendering process is performed to calculate two-dimensional data and represent it as a two-dimensional image. However, even if a printer or the like is employed to prepare such two-dimensional image as a hard copy, it is difficult to represent the texture of the object appropriately in the hard copy on the basis of specular reflection and diffusive reflection.

JP 11-277724A and JP 2000-141708A disclose methods of preparing hard copy which comprise the steps of making color print using an ink-jet recording head, allowing the printed ink to become half-dry, applying a liquid coating agent to the recording medium while the ink is still wet, and thereafter applying uv(ultra violet) radiation to solidify the coating agent. These techniques claim the ability to produce print having high scratch resistance.

JP 2001-53943A discloses an image forming system that picks up color information and gloss information or non-gloss information from the image to be reproduced and which records image on a recording medium on the basis of the two kinds of information.

According to the disclosure, a landscape oil painting art is reproduced on a recording medium by means of an. ink-jet printer and varnish is then applied to the recording medium in an amount controlled in accordance with the intensity of gloss information, whereby the surface gloss of the image is so adjusted as to prepare a hard copy that faithfully reproduces the original image.

However, the surfaces of prints prepared by the above-described methods and image forming system are such that they are not fully capable of reproducing an image area that has predetermined surface properties and a desired degree of gloss. What is more, the thickness of a color ink layer that is formed from ink droplets ejected during image recording varies with the volume of ink ejection, so a thicker color ink layer forms in image areas of higher recording density, thus creating steps on the surface in accordance with the varying thickness of the color ink layer.

SUMMARY OF THE INVENTION

The present invention has been accomplished under these circumstances and its principal object is to provide a method of preparing hard copies by forming a transparent coating layer as the outermost layer in image recorded areas of a recording medium, characterized in that the coating layer can reproduce an even more accurate gloss than in the prior art and presents the desired surface properties in the absence of steps even if there is unevenness in image recording density, whereby the image has a sufficiently improved texture to look more real.

The invention provides a method of preparing a hard copy by forming a transparent coating layer on a recording medium in areas where image has been recorded, comprising the steps of: causing clear droplets to fly from a recording head toward the areas where image has been recorded; curing the droplets while they are in flight; and depositing the cured droplets in the image-recorded areas of the recording medium so as to form the coating layer.

Preferably a curing intensity of the curing step that is to be performed on the droplets can be adjusted in accordance with the image as recorded on the recording medium.

Then, an adjustment of the intensity of the curing step that is to be performed on the droplets is preferably for changing viscosity of the droplets as they are deposited on said recording medium.

The surface roughness of the coating layer that is formed of the droplets as they have been deposited and hardened is preferably adjusted by changing the viscosity of the droplets as they are deposited on the recording medium.

The intensity is specifically adjusted for changing the viscosity lower as an image area to be coated by the cured droplets has a higher recording density.

The droplets preferably contain a thermosetting resin material and the curing step comprises applying infrared radiation to the droplets while they are in flight.

DESCRIPTION OF THE PREFERRED EMBODIMENTS

The method of the invention for preparing hard copies is described below in detail with reference to the preferred embodiments shown in accompanying drawings.

Figure 1:
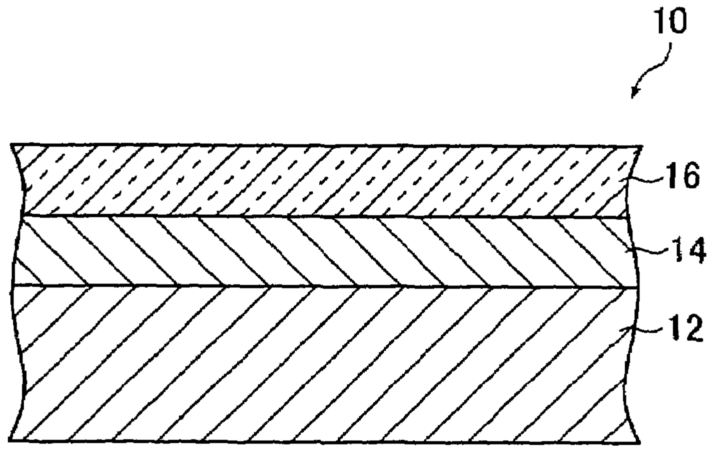
FIG. 1 is a sectional view showing in concept a hard copy that is prepared by the method of the invention.

FIG. 1 is a sectional view showing in concept a hard copy that is prepared by the method of the invention using a printer or the like.

A hard copy generally indicated at 10 in FIG. 1 comprises a recording medium 12 overlaid with a color ink layer 14 that is formed, pixel by pixel, from ink droplets ejected in a controlled number or volume and which in turn is overlaid with a transparent overcoat layer 16 that presents the desired surface properties in the absence of steps even if there is unevenness in image recording density.

The term "surface properties" as used with the overcoat layer 16 refers to the surface roughness of the layer due to the tiny asperities in its surface and the diffusive reflectance and specular reflectance of the overcoat layer 16 vary with its surface roughness. Thus, an object area such as the sea sparkling in summer is reproduced in the overcoat layer 16 as a glossy part having high specular reflectance; on the other hand, an object area such as a tree-covered island in the sea is reproduced as a part having tiny asperities in the surface and, hence, high diffusive reflectance.

When image is recorded with viscous liquid or pigment-containing liquid, the thickness of the color ink layer typically increases with the recording density and where an area of higher recording density adjoins an area of lower density, the thickness of the color ink layer becomes discontinuous to create a step and the overcoat layer formed on top of the color ink layer also has a step. This is not the case with the hard copy 10 of the present invention and the overcoat layer 16 presents the desired surface properties in the absence of steps even if there is unevenness in recording density. For further details, see below.

Figure 2:
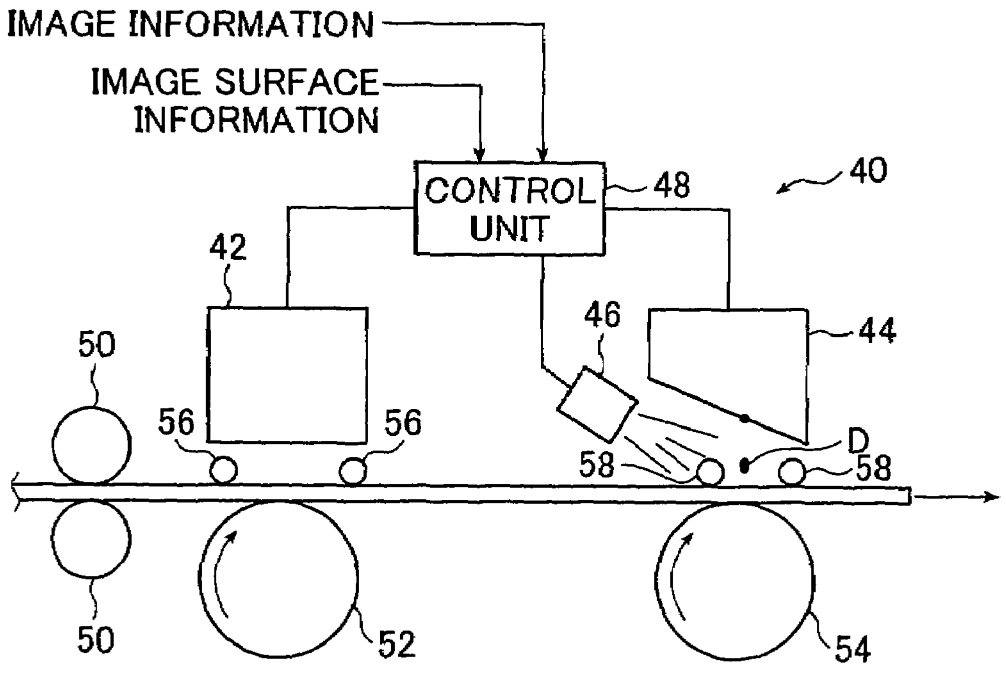
FIG. 2 is a schematic representation of an example of hard copy preparing machine that is employed to implement the method of the invention.

FIG. 2 is a schematic representation of a hard copy preparing machine 40 as an example of the machine that can prepare the hard copy 10.

The hard copy preparing machine 40 shown in FIG. 2 comprises a droplet ejecting head 42 which ejects droplets of color ink to form the color ink layer 14, a droplet ejecting head 44 which ejects droplets D of a clear gloss forming liquid in order to form the overcoat layer 16 on top of the formed color ink layer 14, an ir(infrared ray) radiation applicator 46 which cures the droplets D as they are in flight after being ejected from the head 44, a control unit 48 which controls the driving of the heads 42 and 44 and the ir radiation applicator 46 on the basis of image information which are supplied pixel by pixel and image surface information, compressing/heating rollers 50 which are provided upstream of the head 42 in transport direction such that the recording surface of the recording medium is compressed and heated before recording is effected on the medium, and drive rollers 52, 54 and nip rollers 56, 59 for transporting the recording medium.

The head 42 is a known color droplet ejecting head that records the desired image as it is driven under control by image recording control signals generated in the control unit 49 on the basis of image information. For example, it may be a thermal ink-jet head, a piezoelectric ink-jet head or an electrostatic ink-jet head.

The head 44 is a droplet ejecting head that forms the overcoat layer 16 as it is driven under control by image surface recording control signals generated in the control unit 48 on the basis of image surface information. Like the head 42, this head 44 may be a thermal ink-jet head, a piezoelectric ink-jet head or an electrostatic ink-jet head.

The image information supplied to the control unit 48 may comprise red, green and blue image signals generated pixel by pixel in order to form a color image, and the image surface information comprises image surface signals also generated pixel by pixel.

The control unit 48 generates image surface recording control signals such that the ir radiation applicator 46 cures the droplets D as they are in flight after being ejected from the head 44. To state in greater detail, the ir radiation applicator 46 corresponds to the droplet curing means of the invention and adjusts the intensity of ir radiation in accordance with the image surface information such that the intensity of the curing step to be performed on the droplets D is adjusted in accordance with the image recording position. If the intensity of the ir radiation applied is increased, the thermal curing of the flying droplets D is accelerated, whereby the stickiness (viscosity) of droplets D as they are deposited on the recording medium is sufficiently increased that a thicker overcoat layer 16 is formed from the droplets D.

Needless to say, ir radiation may be kept applied to the droplets D even after they were deposited on the recording medium. If desired, an ir radiation of constant intensity may be applied and its duration controlled instead of adjusting the intensity of ir radiation. The droplets D to be cured by ir radiation contain a thermosetting resin material.

An example of the thermosetting resin material is a resol resin produced by reacting a phenol with an excess of formaldehyde in the presence of a basic catalyst. Resole resins having fluidity can be obtained by proper adjustment of these starting materials. Upon heating with the applied ir radiation, the resole resins undergo self-condensation and their compositional structure forms a three-dimensional network to become hardened.

The clear gloss forming liquid to be ejected as droplets from the head 44 contains the above-described resin material.

If desired, the thermosetting resin material may be replaced by thermoplastic resin materials.

In the embodiment under consideration, the ir radiation applicator 46 is employed as the droplet curing means which applies ir radiation to harden droplets. If desired, the ir radiation applicator 46 may be replaced by an apparatus that applies uv radiation or electron beams to flying droplets D such that they are cured during flight after being ejected from the head 44.

For example, if uv radiation is to be applied, the clear gloss forming liquid may be of such a type that a multi-functional acrylic ester as a photopolymerizable prepolymer (oligomer) and benzophenone, benzoisoalkyl ether or α, α-diethoxyacetophenone as a radical initiator are contained in a photopolymerizable diluent (monomer) and cured by photo-radical polymerization. If desired, curing may be accomplished by cationic polymerization.

If electron beams are to be applied, silicone having acrylic groups may be cured by radical polymerization.

In the hard copy preparing apparatus 40 shown in FIG. 1, the recording medium being transported from the upstream end of transport direction is passed between the compressing/heating rollers 50 so that its recording surface is heated. Then, in accordance with image recording control signals prepared in the control unit 48 on the basis of the image information, the desired image is recorded by means of the droplet ejecting head 42.

In the process of image recording, the droplets of color ink that have been deposited on the recording medium are dried rapidly as excess moisture is evaporated from within the droplets on the recording surface of the recording medium that is being heated by the compressing/heating rollers 50.

By being passed between the compressing/heating rollers 50, the recording medium can be conditioned to have homogenous surface properties, so the present invention has an additional advantage that the effect of the transparent coating layer (overcoat layer 16) does not depend on the recording medium.

After image recording, the clear gloss-forming liquid is ejected as droplets D from the head 44. The flying droplets D are irradiated with the ir rays from the ir radiation applicator 46, so that their curing starts and proceeds during flight.

In this case, the intensity of the ir radiation to be applied to the droplets D is adjusted in accordance with the image surface recording control signals generated in the control unit 48 on the basis of the image surface information.

Stated specifically, in order to enhance the viscosity of the droplets D as they are deposited on the recording medium, the intensity of the ir radiation to be applied to the droplets D is sufficiently increased that they become more hardened during flight. On the other hand, in order to lower the viscosity of the droplets D as they are deposited on the recording medium, the intensity of the ir radiation is reduced so that they become less hardened during flight.

Figure 3:
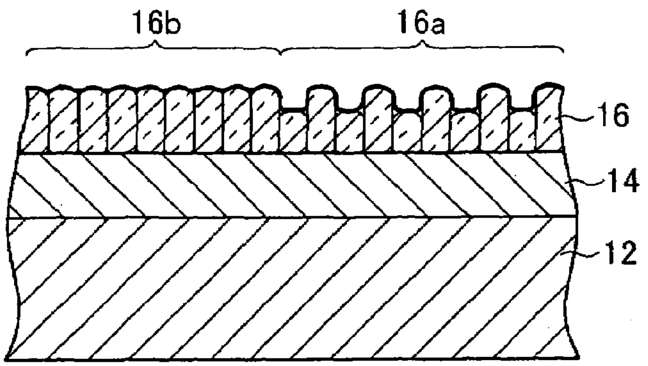
FIG. 3 shows in section an example of hard copy that is prepared by the method of the invention.

Take, for example, the case of adjusting the surface properties of the overcoat layer 16 as it is formed from the droplets D. If droplets D that are being deposited in adjacent positions on the recording medium are irradiated with different intensities of ir, asperities can be formed in the surface of the overcoat layer 16, as in an area designated by 16*a* in FIG. 3, after deposition and hardening of the droplets D. Note that the asperities in the surface of the overcoat layer 16 shown in FIG. 3 are exaggerated. If all droplets D that are being deposited are irradiated with ir of constant intensity, the overcoat layer 16 can have a smooth surface, as in an area designated by 16*b* in FIG. 3, after deposition and hardening of the droplets D.

Figure 4:
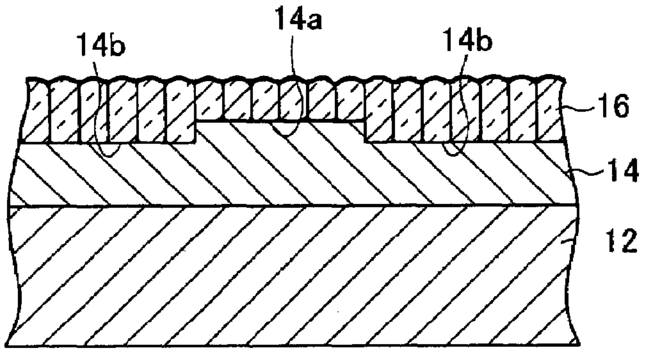
FIG. 4 shows in section another example of hard copy that is prepared by the method of the invention.

A problem with the case of recording with the head 42 using a viscous color ink or pigment-containing ink is that those image areas which are of higher recording density have either a large number of specified droplets deposited or have droplets of large volume deposited, thereby forming steps in the color ink layer 14 at the boundaries with the image areas of lower recording density. However, as shown in FIG. 4, according to the invention, even If steps form in the color ink layer 14, the droplets D being deposited in the area 14*a* having the thick color ink layer 14 (see FIG. 2) are irradiated with less intense ir, so that they will be deposited in that area with a lower viscosity than the droplets D which are to be deposited in other areas 14*b*, thus forming a thin overcoat layer 16 in the area 14*a*. In this way, the intensity of the curing process is adjusted in accordance with what kind of image is recorded on the recording medium.

Figure 5:
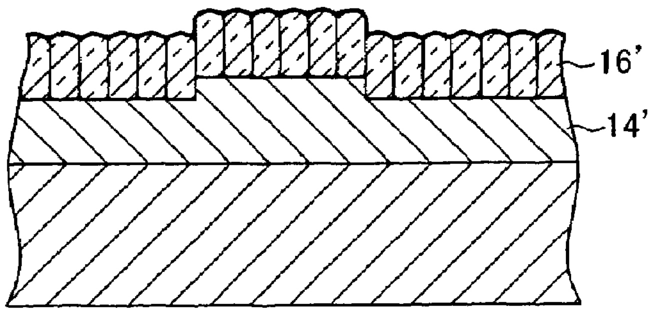
FIG. 5 PRIOR ART
FIG. 5 is a sectional view showing in concept a hard copy that is prepared by the prior art method.

In the prior art disclosed in JP 11-277724A, JP 2000-141708A and JP 2001-53943A, the overcoat layer has uniform thickness, as indicated by 16' in FIG. 5. This means a step on the color ink layer 14' will affect the surface of the overcoat layer 16' to form a corresponding step on it.

However, the hard copy preparing apparatus 40 of the invention eliminates all steps that would otherwise be formed depending on the thickness of the color ink layer and can hence prepare hard copies having a variety of surface properties ranging from smooth surface to silk surface.

In addition, the step of curing droplets begins while they are flying, so at the time the droplets are deposited on the recording medium, they have already begun to harden and the overcoat layer will dry quickly enough to improve the efficiency of hard copy preparation. Since the droplets have already begun to harden and present with higher viscosity at the time they are deposited on the recording medium, the droplets now depositing cannot cause the deposited droplets of color ink which has formed the color ink layer to spread over the recording medium.

In the foregoing embodiments, the image areas are formed on the recording medium using color ink but this is not the sole case of the invention and image areas may be formed on recording media having a light-sensitive or a heat-sensitive material.

While the method of the invention for preparing hard copies has been described above in detail, the present invention is by no means limited to the foregoing embodiments and it should be understood that various improvements and modifications can be made without departing from its spirit and scope.

As described above in detail, in order to prepare hard copies by the invention, clear droplets are caused to fly toward an area of a recording medium where image has already been recorded and during their flight, the droplets are cured to harden to form a transparent coating layer. The intensity of the curing process to be performed on the droplets can be freely adjusted. As a result, in comparison to the prior art, the coating layer can reproduce an even more accurate gloss in accordance with the image and it presents the desired surface properties in the absence of steps even if there is unevenness in image recording density, whereby the image has a sufficiently improved texture to look more real.

What is claimed is:

1. A method of preparing a hard copy by forming a transparent coating layer on a recording medium in areas where image has been recorded, comprising the steps of:

causing clear droplets to fly from a recording head toward areas where an image has been recorded;

curing said clear droplets while they are in flight using a curing intensity which varies depending on said image on said recording medium wherein at least some of said droplets being cured to a different viscosity than other droplets based on adjustments to said curing intensity which are related to said image which is recorded on said recording medium;

depositing said droplets in image-recorded areas of said recording medium so as to form a clear coating layer over said image;

wherein a hard copy having a specified surface property is prepared.

2. The method according to claim 1, wherein an adjustment of the intensity of said curing step that is to be performed on said droplets is for changing viscosity of said droplets as they are deposited on said recording medium.

3. The method according to claim 2, wherein a surface roughness of said clear coating layer that is formed of said droplets as they have been deposited and hardened is adjusted by changing the viscosity of said droplets as they are deposited on said recording medium.

4. A method of preparing a hard copy by forming a transparent coating layer on a recording medium in areas where image has been recorded, comprising the steps of:

causing clear droplets to fly from a recording head toward said areas where image has been recorded;

curing said droplets while they are in flight; and depositing said cured droplets in said image-recorded areas of said recording medium so as to form said coating layer;

wherein a curing intensity of said curing step that is to be performed on said droplets is adjusted in accordance with the image as recorded on said recording medium and an adjustment of the intensity of said curing step that is to be performed on said droplets is for changing viscosity of said droplets as they are deposited on said recording medium; and wherein the intensity is adjusted for changing the viscosity lower as an image area to be coated by the cured droplets has a higher recording density.

5. The method according to claim 1, wherein said droplets contain a thermosetting resin material and said curing step comprises applying infrared radiation to said droplets while they are in flight.

6. The method according to claim 1, wherein the prepared hard copy accurately reproduces gloss.

7. The method according to claim 1, wherein the prepared hard copy presents desired surface properties even if there is unevenness in recording density.

8. The method according to claim 1, wherein the prepared hard copy is textured and looks real.

* * * * *